May 27, 1969 C. L. SANDSTROM 3,447,041
CONDITION RESPONSIVE CONTROLLED RECTIFIER CIRCUIT
Filed Feb. 3, 1967
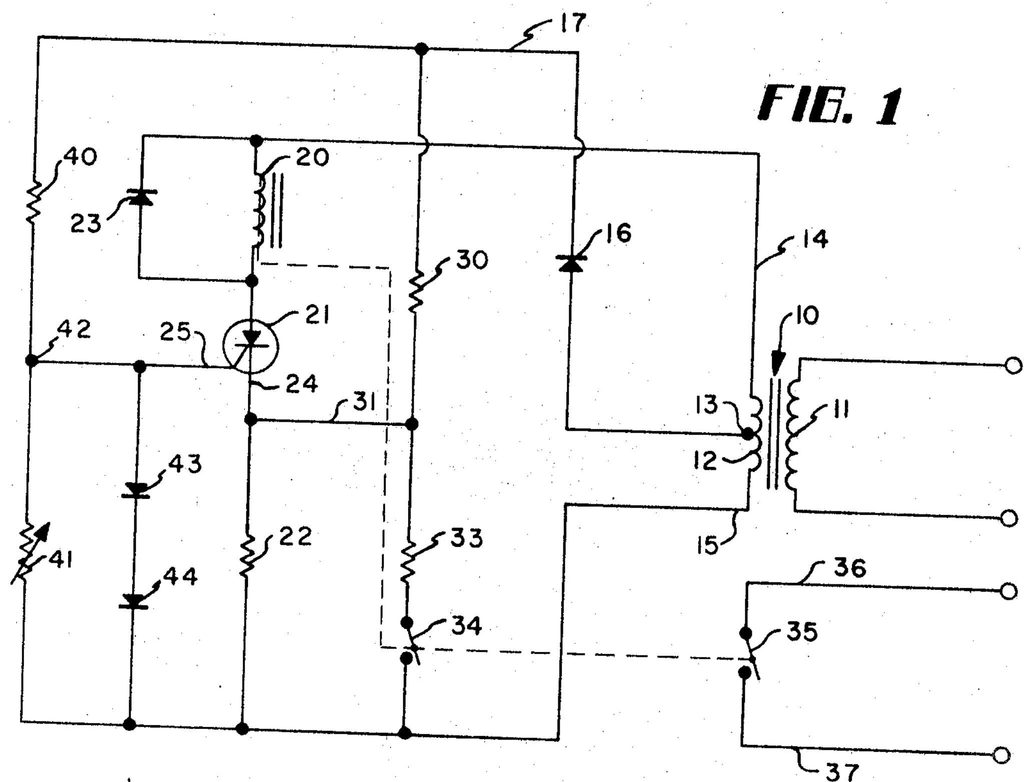
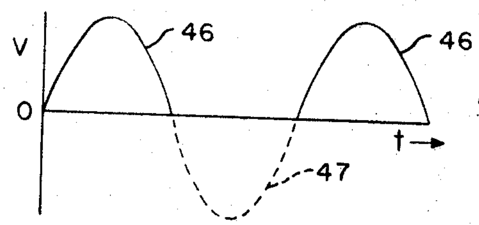
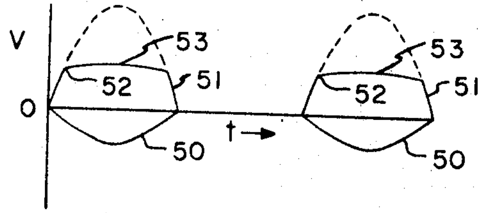
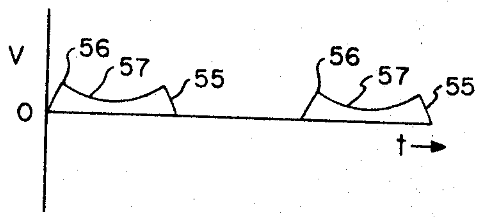
INVENTOR.
CLIFFORD L. SANDSTROM
BY Alfred N. Feldman
ATTORNEY United States Patent Office 3,447,041

Patented May 27, 1969

3,447,041

CONDITION RESPONSIVE CONTROLLED RECTIFIER CIRCUIT

Clifford L. Sandstrom, Bloomington, Minn., assignor to Honeywell Inc., Minneapolis, Minn., a corporation of Delaware Filed Feb. 3, 1967, Ser. No. 613,861
Int. Cl. H01h *47/32, 9/56*
U.S. Cl. 317—148.5 7 Claims

ABSTRACT OF THE DISCLOSURE

A condition responsive silicon controlled rectifier circuit for operating a relay wherein the gate circuit of the silicon controlled rectifier has a back bias and a forward bias supply combined for control of the silicon controlled rectifier. The gate circuit includes a voltage limiting element that clips the forward bias voltage to the silicon controlled rectifier and insures that the rectifier fires early in the applied voltage cycle, if at all.

BACKGROUND OF THE INVENTION

The present invention can be generally applied to any silicon controlled rectifier circuit where a relay is energized by means of conduction of the silicon controlled rectifier. Since the amount of energy supplied to the relay associated with the silicon controlled rectifier is a function of the point in the cycle at which the silicon controlled rectifier conducts or fires, it is sometimes desirable to make sure the firing is at a fixed point to thereby control the total amount of energy dissipated in the relay. If some economical way can be found to insure the conduction of the silicon controlled rectifier at a particular point in the applied voltage cycle, the selection of a relay to be matched with this circuit is made possible. If the firing point varies between the beginning of the applied voltage cycle and the 90° point, as is common, the relay associated with the circuit must have the capabilities of dissipating quite a wide range of power. This makes the type of relay critical and expensive.

SUMMARY OF THE INVENTION

The present invention is specifically directed to the operation of a relay through a silicon controlled rectifier which is fired at or near the beginning of the applied voltage cycle, if at all. If the silicon controlled rectifier can be fired near the beginning of the applied voltage cycle, the relay associated with the silicon controlled rectifier receives a rather substantial amount of electrical power and can be conveniently designed and more economically built. It has been found that this can be accomplished quite economically by the present invention wherein an alternating current back bias is applied to the cathode circuit of the silicon controlled rectifier and is combined with a slowly changing condition responsive signal applied in a positive manner to the gate of the silicon controlled rectifier. In order to accomplish this combination, a voltage limiting means must also be used to in effect clip the forward signal to the gate circuit and limit its magnitude. If the two signals are thus combined, the ultimate bias or signal voltage applied to the silicon controlled rectifier rises at the beginning of the applied voltage cycle and then reverses itself in magnitude at an early point in the cycle. The combined use of a forward voltage and a back bias without voltage limiting the forward voltage is known, but did not adequately control the firing point. With the present arrangement, the silicon controlled rectifier either fires early in the cycle or has its bias reduced so that it cannot fire at all.

A BRIEF DESCRIPTION OF THE DRAWING

FIG. 1 is a schematic of the basic circuit of the condition responsive controlled rectifier circuit;

FIGURE 2 is a representation of the waveform of the applied voltage to the networks of the device of FIGURE 1;

FIGURE 3 is a representation of the waveform of the forward bias and back bias applied to the silicon controlled rectifier gate means; and FIGURE 4 is a representation of the waveform of the total bias applied to the gate means between the gate and cathode of the silicon controlled rectifier.

DESCRIPTION OF THE PREFERRED EMBODIMENT

The schematic diagram of FIGURE 1 includes a transformer generally disclosed at 10 having a primary winding 11 energized from a conventional alternating current source. A secondary winding 12 is tapped at 13 and has two end conductors 14 and 15. Connected to the tap 13 is a diode 16 for rectification of the potential to supply a pulsating direct current on conductor 17.

The voltage appearing between conductors 14 and 15 of the secondary winding 12, which preferably is a step-down type of winding, is applied across a series circuit made up of a control means 20 in the form of a relay; a controlled rectifier means 21, in the form of a silicon controlled rectifier; and a bias resistor 22. The control means or relay 20 is shunted by a conventional diode 23 that is a free-wheeling diode for protection of the system on the collapse of the field in the relay 20. The silicon controlled rectifier 21 has a cathode 24 and a gate means 25. The bias supplied to the silicon controlled rectifier 21 for its control is applied between the cathode 24 and the gate means 25.

The balance of the circuit is made up of two voltage divider networks that form a back bias and forward bias supply circuit for the silicon controlled rectifier 21. The back bias voltage divider network means includes a resistor 30 that is connected to conductor 17, and conductor 31 which is connected to the cathode 24 of the silicon controlled rectifier 21. The conductor 31 also connects the resistor 30 to resistor 22. The resistor 22 is in turn connected back to the conductor 15. The voltage applied to the back bias voltage divider network made up of resistors 30 and 22 is a half-way rectified waveform, as will be pointed out subsequently in the present disclosure. The back bias voltage divider network is completed by another resistor 33 joined to resistor 30 and further connected through a relay contact 34 of a normally open type that is operated by the control means or relay 20. The contact 34 is open when the relay 20 is de-energized, but closes when the relay 20 is operated to alter the voltage applied to the cathode 24 of the silicon controlled rectifier 21. An additional relay contact 35 is supplied between conductors 36 and 37. The circuit made up of the contact 35 and conductors 36 and 37 is in effect the output circuit for the overall condition responsive system disclosed and can be used to control any device in response to operation of the control means or relay 20.

The conductor 17 is also connected to a second voltage divider network means made up of a resistor 40 and a condition responsive means or resistor 41. The condition responsive resistor 41 can be responsive to any type of condition, or can be simply a thermistor, as is well known in the art. The resistor 40 along with the condition responsive resistor 41 makes up a condition responsive voltage divider means that is connected at 42 to the gate means 25 of the silicon controlled rectifier 21. The balance of the circuit is made up of a pair of diodes 43 and 44 that are connected in series between the gate means 25 and the conductor 15. A pair of diodes are shown, as this is the most economical way of obtaining the necessary voltage characteristics. The present circuit is not limited to the use of two diodes but could include a single diode, multiple diodes, or diodes of the Zener type. The diodes 43 and 44 make up a voltage limiting means or diode means conducting at a voltage above the voltage required at the gate means to cause the silicon controlled rectifier to conduct to energize the relay 20.

In FIGURE 2 a voltage waveform that appears on conductor 17 is disclosed. The upper portion 46 is the typical half-way alternating current voltage available from the transformer means 10 through the diode 16, and has the portion 47 clipped or removed by the diode 16. It will be noted that the conductor 17 thus applies a half-way rectified voltage to each of the voltage divider network means that include the bias circuit for the silicon controlled rectifier 21.

In FIGURE 3, the actual voltage appearing between the gate means 25 and the conductor 15, along with the voltage appearing across the resistor 22 is shown. The voltage appearing across the resistor 22 is indicated at 50, while the voltage appearing from the gate means 25 to conductor 15 is disclosed at 51. It is noted that the voltage waveform 50 is negative or forms a back bias while the voltage 51 is a positive voltage that is clipped at 52 at the forward conduction voltage of the combination of diodes 43 and 44. The voltage 51 rises very slightly at 53 as is typical of the voltage appearing across diodes in a forward conduction condition.

In FIGURE 4, a voltage waveform 55 is disclosed which is a composite of the voltage waveforms 50 and 51. The voltage waveform 55 in fact is the bias applied between the cathode 24 and the gate means 25 of the silicon controlled rectifier 21 for the triggering of the silicon controlled rectifier 21 to energize the relay 20. It will be noted that the waveform 55 peaks at 56 and then falls off at 57, and is a control voltage for the silicon controlled rectifier 21 that reduces in magnitude very early in the applied cycle at 56.

In the operation of the overall circuit, the voltages are normally applied to the system from a source means made up of the transformer 10 and the diode 16 along with the conductors 14 and 15 so that the necessary potentials for energizing the circuit and operating the relay 20 are available. As the conditioned responsive element 41 varies, the voltage applied to the silicon controlled rectifier 21 between the cathode 24 and the gate means 25 will also vary. If the voltage between the cathode 24 and the gate means 25 reaches a sufficient magnitude, the silicon controlled rectifier 21 will be turned on to energize the relay 20. In the present circuit once this point has been reached the relay 20 closes the contact 34 to parallel the resistor 33 with resistor 22 thereby changing the back bias voltage insuring that the relay 20 stays energized. It will be noted in FIGURE 4 that the voltage applied between the cathode 24 and the gate means 25 peaks at 56 which is very early in the applied voltage swing as shown in curve 46 of FIGURE 2. This insures that the firing of the silicon controlled rectifier 21 occurs early in the cycle of the applied voltage or has the gate bias reduced so that the device will not fire at all. Once the silicon controlled rectifier 21 fires, the voltage is sufficiently changed by the back bias resistor 33 and contact 34 of relay 20 to insure that it continues to conduct as long as a stable signal is received.

The desirability of the present arrangement can be appreciated when it is considered that in normal firing circuits for silicon controlled rectifiers, the firing point can vary anywhere from early in the cycle to the 90° point of the applied voltage. If the firing occurs at or near the 90° point it is obvious that only a quarter wave of energization is applied to the relay 20. If the firing occurs early in the cycle substantially a full half wave is applied to the relay 20. As a resclt of this, the relay 20 must be able to operate over wide ranges of energy if used in a conventional circuit. In the present circuit, the firing of the silicon controlled rectifier 21 always occurs very early in the applied voltage cycle or does not occur at all. With the present arrangement, the relay 20 can be designed so as to respond to a substantially full half wave energization and therefore is easier to design, and the dissipation characteristics are relatively constant no matter what the variation in the sensed condition may be. In effect, the present arrangement prevents the silicon controlled rectifier 21 from modulating the power to the relay 20 but always insures that relay 20 receives substantially the same power every time it is energized. It is obvious that this is a very desirable characteristic and establishes a reliable point of operation for the relay 20. It is further obvious that the present arrangement could be used with circuits that have silicon controlled rectifiers in a back-to-back configuration for a full wave or substantially full wave energization of the relay. This technique also can be applied to a device known as a triac, which is a single unit that has characteristic similar to a back-to-back pair of silicon controlled rectifiers but has a single gate means.

The embodiments of the invention in which an exclusive property or right is claimed are defined as follows:

1. A condition responsive controlled rectifier circuit, including: controlled rectifier means including connection means adapted to be connected to control means and electrical source means; said controlled rectifier means including gate means for receiving a control voltage capable of causing said controlled rectifier means to energize said control means; voltage bias means connected to said controlled rectifier means to apply a back bias voltage thereto; and condition responsive voltage bias supply means including voltage limiting means connected to said gate means to apply a condition responsive forward voltage to said controlled rectifier means; said bias and forward voltages combining at said gate means into said control voltage which first increased and then decreased in magnitude early in the cycle of the electrical source means.

2. A condition responsive controlled rectifier circuit as described in claim 1, wherein said voltage bias and condition responsive supply means are voltage divider means adapted to be connected to said source means.

3. A condition responsive controlled rectifier circuit as described in claim 2, wherein said controlled rectifier means is a silicon controlled rectifier and said control means is a relay.

4. A condition responsive controlled rectifier circuit as described in claim 3, wherein said voltage limiting means is diode means having a forward characteristic voltage above the voltage required at said gate means to cause said silicon controlled rectifier to conduit to energize said relay.

5. A condition responsive controlled rectifier circuit as described in claim 4, wherein said back bias voltage divider means includes a first resistor in shunt circuit with a second resistor and a normally open contact of said relay; said first resistor being shunted by said second resistor upon operation of said relay to alter back bias voltage to insure that said silicon controlled rectifier remains conductive after intially energizing said relay.

6. A condition responsive controlled rectifier circuit as described in claim 4, wherein said condition responsive voltage divider means includes a condition responsive resistor in parallel with said diode means.

7. A condition responsive controlled rectifier circuit as described in claim 5, wherein said condition responsive voltage divider means includes a condition responsive resistor in parallel with said diode means.

References Cited

UNITED STATES PATENTS

| | | | |
|---|---|---|---|
| 3,258,678 | 6/1966 | Legatti | 323—22 X |
| 3,296,498 | 1/1967 | Chassanoff et al. | 317—148.5 |
| 3,324,355 | 6/1967 | Gessner et al. | 317—148.5 |
| 3,353,071 | 11/1967 | Cable | 317—148.5 |

JOHN F. COUCH, *Primary Examiner.*

G. GOLDBERG, *Assistant Examiner.*

U.S. Cl. X.R.

307—133, 252, 305